Figure 1:
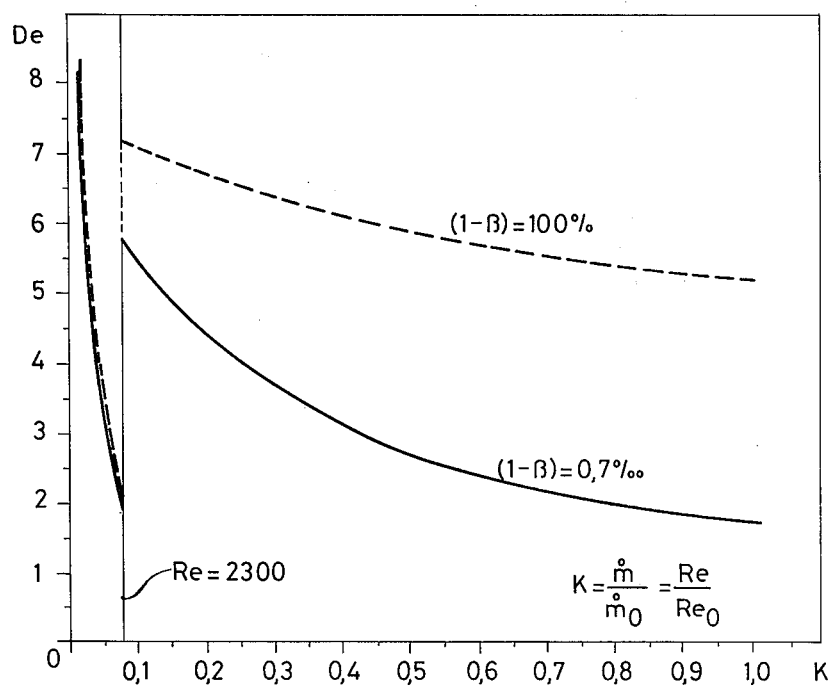

United States Patent [19]

Iniotakis

[11] 4,428,756
[45] Jan. 31, 1984

[54] METHOD AND APPARATUS FOR FILTERING ATOMIC OR MOLECULAR CONTAMINANTS FROM A GAS

[75] Inventor: Nicolaos Iniotakis, Jülich, Fed. Rep. of Germany

[73] Assignee: Kernforschungsanlage Jülich Gesellschaft mit beschränkter Haftung, Jülich, Fed. Rep. of Germany

[21] Appl. No.: 56,784

[22] Filed: Jul. 11, 1979

Related U.S. Application Data

[63] Continuation of Ser. No. 857,885, Dec. 6, 1977, abandoned.

[30] Foreign Application Priority Data

Dec. 7, 1976 [DE] Fed. Rep. of Germany ....... 2655296
Dec. 7, 1976 [DE] Fed. Rep. of Germany ....... 2655310

[51] Int. Cl.$^3$ ...................... B01D 53/22; B01D 53/02
[52] U.S. Cl. ........................................ 55/158; 55/16; 55/66; 55/484
[58] Field of Search ...................... 55/16, 66, 158, 484

[56] References Cited

U.S. PATENT DOCUMENTS

| | | | |
|---|---|---|---|
| 2,735,508 | 2/1956 | Krieble | 55/484 X |
| 2,824,620 | 2/1958 | De Rosset | 55/16 |
| 2,958,391 | 11/1960 | De Rosset | 55/16 |
| 3,019,853 | 2/1962 | Kohman et al. | 55/158 X |
| 3,022,858 | 2/1962 | Tillyer et al. | 55/158 X |
| 3,135,591 | 6/1964 | Jones | 55/158 X |
| 3,262,251 | 7/1966 | Hicks, Jr. | 55/158 |
| 3,269,817 | 8/1966 | Bondley | 55/16 X |
| 3,436,898 | 4/1969 | Kaess et al. | 55/484 X |

FOREIGN PATENT DOCUMENTS

| | | | |
|---|---|---|---|
| 909777 | 4/1954 | Fed. Rep. of Germany | 55/158 |
| 2017861 | 5/1970 | France | 55/158 |

OTHER PUBLICATIONS

Treybal, *Mass-Transfer Operations*, 1968, 2nd Edition, McGraw–Hill Book, Co., pp. 57 & 58.
Bennett et al., *Momentum, Heat, and Mass Transfer*, 1974, 2nd Edition, McGraw–Hill Book Co., pp. 481–491.

*Primary Examiner*—Robert H. Spitzer
*Attorney, Agent, or Firm*—Frishauf, Holtz, Goodman & Woodward

[57] ABSTRACT

Tubular or rod shaped pieces of a filter material having a holding-back capability with respect to the contaminant are arranged in the interior of a containing cylinder through which the gas flows, so as to provide passages for gas flow along the surface of the filter material pieces, the latter being typically disposed with their long dimension parallel to the direction of gas flow. For a prescribed pressure loss through the filter, a maximum value should be obtained for a quantity that is equal to the filter length in the direction of gas flow times the second Stanton number divided by the hydraulic diameter, the latter term being equal to four times the volume of the space in the cylinder not occupied by the filter material divided by the surface of the filter material in contact with the gas. The second Stanton number is the quotient of the material transfer coefficient and the flow velocity of the gas. Favorable filter escape coefficients are made available with relatively low pressure drop, so that the filter can be interposed in the main cooling gas line of a nuclear reactor for removing contaminants as radioactive caesium.

12 Claims, 4 Drawing Figures

FIG. 3
FIG. 4
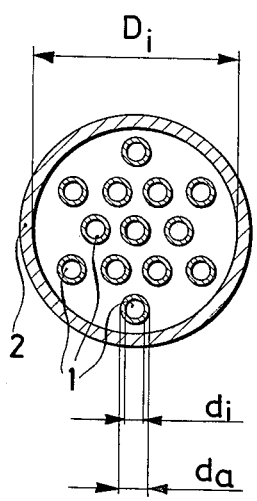
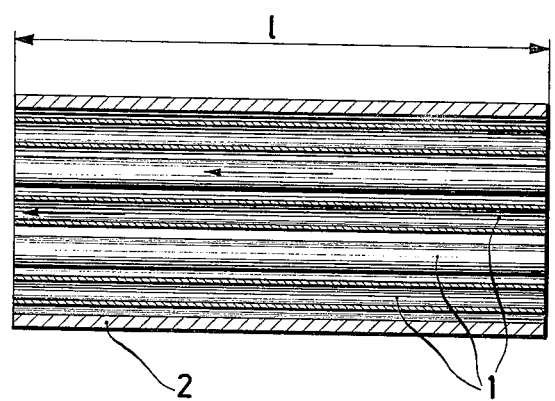

METHOD AND APPARATUS FOR FILTERING ATOMIC OR MOLECULAR CONTAMINANTS FROM A GAS

This is a continuation of application Ser. No. 857,885 filed Dec. 6, 1977, now abandoned.

This invention relates to a filter for cleaning a flowing gas with respect to contaminating material present in the gas as atomic or molecular particles by collecting the contaminating material on the filter and to a method of design and manufacture of such a filter. In particular, the invention relates to a method and an apparatus providing, in a cavity with gas-tight lateral walls, spaced pieces of a filter material having an effect of holding back the particles to be removed from the gas by a mutual effect therewith over a certain length in the direction of the flow of the gas and with a certain effective free diameter (or hydraulic diameter) $d_{eff}$ for the flow of gas.

It is known to provide filters of the above-mentioned type in which the filter material is provided as a loose layer, for example, a granular material within the lateral casing of the filter through which the gas flows. Layers of material are used that provide so far as possible a maximum surface area of the filter material. For the design of the filter, for example the determination of the length of material through which the gas flows, the starting point is determined from experimental values that are available with respect to the particular material that is intended to be used. There is disadvantage in such arrangements, however, that for determination of what is a suitable filter for prescribed operating conditions, very expensive and troublesome experiments are necessary, in which various kinds of filters are subjected to the prescribed operating conditions. In the known filters of this kind, moreover, the filter layers produce very high pressure loss, so that in general they cannot be interposed in main gas ducts of an industrial facility.

The Present Invention

It is an object of the present invention to provide a procedure for designing and manufacturing a filter that makes it possible to produce a filter taking account of the material properties of the filter material, of the mutual reaction with the particles to be held back, as well as the dimensions of the filter mass, optimally suited to the particular task, without making it necessary to carry out expensive and time-consuming sequences of experiments for fitting the filter design to the particular requirements.

It is also an object of the invention to produce a highly effective atomic or molecular filter having a low flow resistance.

Briefly, the filter material consists of a material having the highest possible holding-back capability for the particles to be filtered out of the gas, and it is present within a flow-through cavity in a suitable geometry, preferably in the form of elongated elements such as rods, tubes, strips and the like, spaced from each other in the usual case in which there are more than one, providing through-passages for the flow of the gas extending over the length $l$ of the filter material and having a hydraulic effective diameter $d_{eff}$, and the dimensions are so determined that, for a given pressure loss $\Delta p$ and for a given filter volume, the product $$\frac{l}{d_{eff}} \cdot St'$$

is maximum, where the foregoing product is further defined as follows with reference to the quantities involved therein:

$$d_{eff} = \frac{4V_o}{F}$$

is the hydraulic diameter in cm;
$l$ is the length $l$ of the filter material in cm;
$V_o$ is the cavity volume in $cm^3$ within the lateral walls in the region of the length $l$ left after deduction of the space occupied by the filter material therein;
$F$ is the surface of the filter material in $cm^2$;
$St' = (h/v)$ is the second Stanton number;
$h$ is the mass transfer coefficient in cm/sec;
$v$ is the flow velocity of the gas in cm/sec;

In order to fit the filter of the present invention as effectively as possible to prescribed operating conditions, it can be useful to investigate, as a preliminary step of design, a variety of filter dimensions for several filter materials, in order to obtain the most effective filter for the purpose, in a manner more particularly set forth below as the method of the present invention. It is particularly effective to constitute the filter of the present invention of one or more tubes of the filter material, and preferably a number of them are used in a cavity through which the gas flows, the gas-flow being in the logitudinal direction of the tubes. The filter material can also be provided in the form of rods so arranged in a gas-flow cavity that the gas flows either in the length direction of the rods or across them. The method of determining the constitution of a filter according to the present invention leads to particularly advantageous embodiments of the filter apparatus of the present invention.

In dealing with filters of the type here concerned, it is useful to refer to the "filter escape coefficient," here given the symbol $\delta$, a Greek letter corresponding to the initial of the German name of this coefficient. The literal translation of the German term is "let-through coefficient" and refers to the letting through of a portion of the particles to be filtered out. This coefficient is a function of the filter length $l$ and the expected service life $t$ of the filter and is hence also symbolized $\delta(l,t)$. This coefficient is equal to $$\frac{j(o,t)}{j(l,t)}$$

defined as the quotient of the particle flow $j(o,t)$ upon entrance to the filter and the particle flow $j(l,t)$ upon exit from the filter. The negative natural logarithm of $\delta(l,t)$ is a related filter quality called the "coverage number" De. In mathematical expression: $\delta(l,t) = e^{-De}$. For effective filtering, De is large and $\delta$ is a small fraction of unity, whereas for the absence of a filter De is zero and $\delta$ is unity.

In the design and manufacture of the filter, to put it briefly a filter escape coefficient $\delta(l,t)$, corresponding to a desired filter capability to be attained is selected and, the values of length $l$ and the hydraulic (effective free) diameter $d_{eff}$ are so selected that, for a particular gas flow velocity and a particular mass transfer coefficient, the product of their quotient ($l/d_{eff}$) and the second Stanton number St' is large enough for attaining said filter coefficient, said second Stanton number being the ratio (h/v) of said mass transfer coefficient to said gas flow velocity, both being expressed in cm/sec; and selecting a filter material from among those having a known sticking probability for particles of a particular contaminating material to be filtered out and making from said material at least one substantially rigid element to be disposed in a predetermined arrangement in said cavity, said material being selected on the basis of a predetermined service life t of the filter during which said contaminating particles held back by said filter material accumulate, and according to the following criteria:

(a) the material has a sufficiently high surface sticking probability $\alpha$ for particles of said contaminant on the surface of said element of said material, (b) the material is one for which the desorption constant ($\theta$) regarding said contaminant is sufficiently small, (c) the material is one for which the penetration coefficient ($1-\beta$), and hence also the probability that said contaminant particles do not remain on the surface of the material but rather enter into the material and become irreversibly bound therein, is sufficiently large, in each case sufficiently so for attaining said filter oapability, and (d) that the saturation content ($\phi\infty$) and the diffusion constant (D) are sufficiently large for the product $$\frac{(1-B)\alpha^* N_G}{\sqrt{D} \, \phi_\infty} \sqrt{t}$$

to be smaller than unity, the quantities contributing to said product being defined as follows:

$$\alpha^* = \alpha \cdot 3.63 \cdot 10^3 \sqrt{\frac{T}{A}} \text{ in cm/sec}$$

A = mass number of the particles
T = temperature of the surface of the filter material in °K.

Expressed differently, using the coverage number, and assuming that:

$$De = \frac{4l}{d_{eff}} \cdot St' \cdot \frac{\alpha^*}{\alpha^* + h} \cdot$$

$$\ln\left\{\theta\left(t - \frac{l}{v}\right) + \sqrt{\zeta} \int_0^{t-\frac{l}{v}} \frac{e^{-(\lambda+\theta^*)\tau}}{\sqrt{\tau}} I_1(2\sqrt{\zeta\tau}) d\tau \right\}$$

De is determined by the following Equation I:

$$De = \frac{4l}{d_{eff}} \cdot St' \cdot \frac{\alpha^*}{\alpha^* + h} \cdot$$

$$\ln\left\{\theta\left(t - \frac{l}{v}\right) + \sqrt{\zeta} \int_0^{t-\frac{l}{v}} \frac{e^{-(\lambda+\theta^*)\tau}}{\sqrt{\tau}} I_1(2\sqrt{\zeta\tau}) d\tau \right\}$$

wherein De, $d_{eff}$, l and St' are defined as already given above;

$$\alpha^* = \alpha \cdot 3.63 \cdot 10^3 \sqrt{\frac{T}{A}} \text{ in cm/sec};$$

$\alpha$ is the sticking probability for the particles at the surface of the filter material ($\alpha$ approximately equal to 1 for partial pressures $P \leq 10^{-10}$ atm, if no activating processes are present);
A is the mass number of the particles;
T is the temperature of the surface of the filter material in °K.;

$$\theta^* = \theta\left\{\frac{h + (1-B)\alpha^*}{\alpha^* + h}\right\} \text{ in sec}^{-1};$$

$$\theta = \omega_0 \cdot e^{-\frac{Q}{R \cdot T}} \text{ (in desorption constant in sec}^{-1});$$

$\omega_0 = \sim 1{,}308 \cdot 10^{11} T$ in sec$^{-1}$ (Debye frequency);
Q is the desorption energy in Cal/Mol;
R is the universal gas constant in Cal/(°)Mol;
$\lambda$ is the decay constant for the substance in sec$^{-1}$;
$I_1(x)$ is the modified Bessel function;

$$\zeta = \frac{4l}{d_{eff}} \cdot St' \cdot \frac{h\alpha^*\theta\epsilon}{(\alpha^* + h)^2} \text{ in sec}^{-1};$$

$1-\beta$ is the penetration coefficient; the probability that the particles will become irreversibly bound;
t is the expected service life of the filter;

$$\theta\left(t - \frac{l}{v}\right) = \begin{cases} 1 \text{ for } t > \frac{l}{v} \\ 0 \text{ for } t \leq \frac{l}{v} \end{cases};$$

$$\eta^* = \frac{\eta}{\sqrt{D}} \text{ in sec}^{-\frac{1}{2}};$$

$$\eta = \frac{(1-\beta)\alpha^* \cdot N_G}{\phi\infty} \text{ in cm/sec};$$

$N_G$ is the concentration of the particles in atoms/cm$^3$, and $\phi\infty$ is the maximum number of particles that particular a filter material can take up (absorb) in atoms/cm$^3$.

The mass transfer coefficient h is conveniently calculated by the heat-mass-transport anology. If a filter is to be produced for an installation for cleaning a gas of radioactive particles, and if $$\sqrt{\lambda D} > \eta,$$

then the relation $$\eta^*\sqrt{t} < 1$$

is fulfilled for all values of t and Equation I is always valid.

The process according to the invention makes possible the production of a filter that is suited in an optimal fashion to the conditions required or presented, and thus it is also suited to the particularities of any installation. In general, the previously named magnitudes are so dimensioned that the magnitude of the coverage number is as great as possible, or at least reaches the value that is required by obtaining the predetermined value for the filter escape coefficient. By the establishment of the above set forth mathematical relation it is advantageously possible to carry out investigations of filters for large installations on the basis of a small-scale model in a cost-saving manner. Two filters are accordingly equivalent regarding their particle accumulation; hence with regard to their effectiveness, if they have the same filter escape coefficient and thus have the same value of the coverage number De. It is therefore also possible, proceeding from a simple variety of filter, for example, a piece of tubing through which the gas to be purified flows, to obtain the necessary parameter values for the manufacture of a filter for a large installation. In such a case the simple filter is subjected to different operating conditions and the parameter values are calculated according to Equation I. In the manufacturing method according to the invention, the diffusion of the particles in the filter material is also taken account of. It is therefore advantageously possible to manufacture filters that are also effective at temperatures above 400° C. up to about 1000° C. In contrast, in the manufacture of the known filters, merely the desorption and adsorption of the particles on the surface of the filter material, or chemical reactions of the particles with the surface of the filter material, are taken account of. Accordingly, designers heretofore have tried to provide filter material with as much surface as possible. This has had the result that the known filters have been inadequate for the required effectiveness in the temperature range above 400° C. For this reason, users were required to keep the temperatures in the filter low by cooling. In order to increase the effectiveness of the known filters, moreover, several filters were connected one behind the other, which led to voluminous cleaning installations.

An advantageous version of the design and manufacturing method according to the invention consists in that, at a temperature below about 400° C., for a filter at which the prescribed operation time t for the materials available for selection as filter material, the adsorption-desorption equilibrium for the sticking of the particles is not obtained at the surface of the filter material, a material is provided for the filter material for which the relations hold:

$$2\sqrt{\zeta t} << 1 \text{ and } (\lambda + \theta^*) \cdot t << 1 \quad (a)$$

or for radioactive substances there holds the relation:

$$\lambda >> \theta^* \quad (b)$$

Under these postulates—for example, when a filter is to be provided for cleaning a gas at low temperatures, as for a filter material temperature below 400° C.—the equation for the coverage number simplifies itself into Equation II $$De = \frac{4l}{d_{eff}} \cdot St' \cdot \frac{\alpha^*}{\alpha^* + h} \quad (II)$$

In a filter of the kind in which the filter material is selected so that the length l and the hydraulic diameter $d_{eff}$ are such that the value of the coverage number De reaches a prescribed value in accordance with the simplified formula given in Equation II, the sorption-desorption equilibrium for the sticking of the particles on the surface material is not reached.

If the relation (b) is fulfilled, then the relation (a) holds for all values of t and a filter according to Equation II and is then effective without limit of time. According to the Equation II, with use of a material having a sufficient sticking probability for the particles to be held back, the dimensions of the filter are such that the expected filter escape coefficient δ is either as small as possible or corresponds to a predetermined value.

A further advantageous variation of the manufacturing procedure according to the invention consists in that, in a temperature range above about 600° C., for a filter with which during the predetermined operation time t for the materials selectable as filter material, the adsorption-desorption equilibrium for the particles is obtained for the sticking of the particles at the surface of the filter material and a material is provided as a filter material that has a penetration coefficient that is as high as possible and for which the relations $$2\sqrt{\zeta t} >> 1 \text{ and } (\lambda + \theta^*) t > 2\sqrt{\zeta t} \text{ and } \theta^* >> \lambda$$

hold. The formula for the coverage number De then is simplified to Equation III:

$$De = \frac{4l}{d_{eff}} \cdot St' \cdot \frac{(1-\beta) \cdot \alpha^*}{h + (1-\beta) \cdot \alpha^*} \quad (III)$$

In this variation of the filter in accordance with the invention, the diffusion of the particles and the filter material is made use of.

Also in this case, the dimensions of the filter are so measured that De is as large as possible or has a value for which the filter escape coefficient δ reaches the prescribed value. According to the choice of the filter material and the dimensions of the filter, such a filter obtains a high effectiveness even at high temperatures up to 1000° C.

Furthermore, a modification of the procedure according to the invention is very advantageous that consists in that for obtaining of the longest possible operation time t while holding constant the small filter escape coefficient δ that holds for the thickness ε of the filter material for radioactive substances, the following relation holds:

$$\epsilon >> \sqrt{\frac{D}{\lambda}}$$

and for non-radioactive substances, the following relation holds:

$$\epsilon >> \sqrt{Dt}$$

in which D is the diffusion coefficient for the particles in the filter material. This form of filter and this version of the design procedure, in contrast with the methods of design and manufacture conventional up to now, not only is the adsorption-desorption behavior of the particles at the surface of the filter material considered, but the diffusion of the particles in the filter material is also utilized in the design of the filter. Whereas in the known filters, the installation life of the filter depended exponentially upon the reciprocal of the temperature, it is now possible by selection of a filter material with sufficient thickness to produce a filter that, by utilizing the diffusion of the particles in the filter material, has a long service life t, particularly at high temperatures.

A filter built according to the procedure using Equation I is suited in optimum fashion to the specified operating conditions and hence to the special situations and pecularities of a particular installation. The magnitudes involved in the method of design are such that the magnitude of the coverage number is maximized, or at least brought up to the value which is necessary for obtaining the prescribed value for the filter escape coefficient.

Since the filter of the present invention can be provided and operated at high temperatures as well as at lower temperatures more commonly used heretofore, the filter of the present invention is particularly advantageous for cleaning the cooling gases of a gas-cooled nuclear reactor. This application of the filter of the present invention makes unnecessary the usual cooling system required for conventional filters in such service. In fact, rather than merely substituting a filter of the present invention in a separate circulation system in which the cooling gas of a nuclear reactor is cleaned, a still more advantageous kind of operation can be provided by inserting the filter of the present invention directly in the main gas stream of a gas-cooled nuclear reactor.

DRAWINGS, ILLUSTRATING AN EXAMPLE

Figure 2:
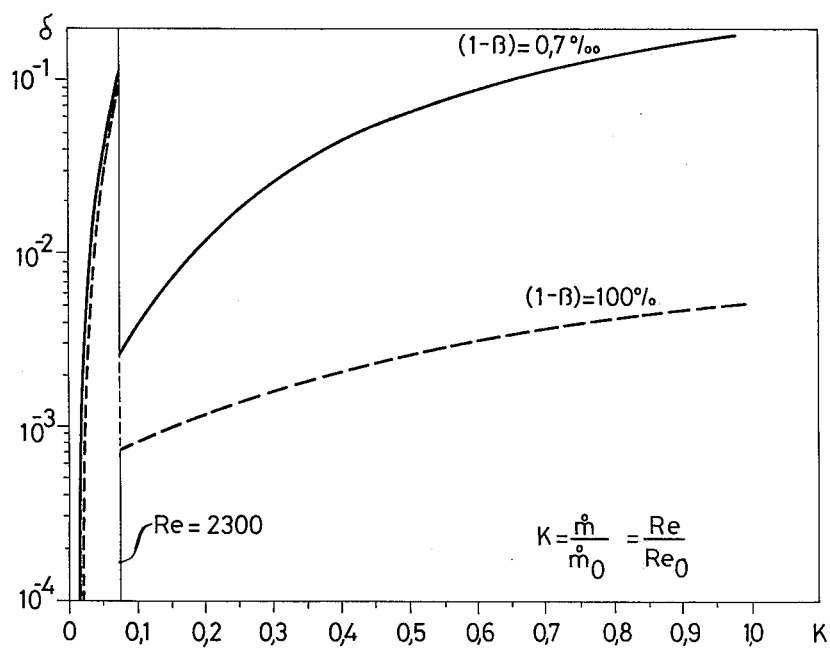

The possible variations of the construction data for the manufacture of a filter of a prescribed material for various different operating conditions is explained in illustrative examples below, with reference to the diagrams set forth in the annexed drawings, in which:

FIG. 1 is a graphical representation of the magnitude of the coverage number De as a function of the mass throughput or of the Reynolds number, and FIG. 2 is a graphical representation of the filter escape coefficient $\delta$ as a function of the mass throughput or the Reynolds number.

In two further illustrative embodiments the results of experimental investigations with filters are compared with the values obtained according to Equation I for the filter escape coefficient $\delta$.

Further, in additional illustrative examples, the construction data required for production of a filter are given for different operating conditions. In this connection, additional drawings are provided, in which:

FIG. 3 is a longitudinal section of a filter consisting of a bundle of parallel tubes, and FIG. 4 is a cross-section through the filter shown in FIG. 3.

EXAMPLE I

For calculating the construction data for the provision of a filter of tubes arranged parallel to each other, the Equation I for the coverage number De is evaluated and the filter escape coefficient $\delta$ is calculated in dependence upon the mass throughput rate m of a gas flowing through a tube.

The tube to which the calculation relates has the length $l = 800$ cm and the diameter $d = 1$ cm. The region of the mass throughput drawn into consideration comprises $10^{-2}$ to 12 g/sec. For the gas temperature, and at the same time the wall temperature of the tube, 950° C. is assumed, and likewise it is assumed that the gas pressure p equals 40 bar. As particles that are to be filtered out of helium, atoms of caesium 137 are taken into consideration. In this connection, two different wall materials are postulated, one having a penetration coefficient of $1-\beta = 0.7°/_{oo}$ and the other having $1-\beta = 100\%$. Whereas the value of $0.7°/_{oo}$ for Cs 137 is characteristic for materials with cubic face-centered lattices, the penetration coefficient of 100% means that the material used is a perfect "diffusor." The symbol $°/_{oo}$ means parts per thousand.

For effective showing of the characteristic of the filter, the mass throughput is varied in accordance with a parameter K, which is determined by the relation $$\dot{m} = K \cdot \dot{m}_o$$

in which $\dot{m}_o$ is the mass throughput value which is taken into consideration as the reference magnitude.

Since there is a linear relation between the Reynolds number Re and the mass throughput m, there also holds the following relation:

$$Re = K \cdot Re_o$$

Here $Re_o$ designates the Reynolds number for the mass throughput $\dot{m}_o$.

As can be seen from the graphical representation given in FIG. 1 and FIG. 2, the filter characteristic has a jump at a value of $K = 0.077$. The value for K corresponds to a value for the Reynolds number of about $Re = 2300$. This discontinuity is produced by the fact that the Sherwood number Sh and accordingly the material transfer coefficient h or the Stanton number St', likewise show a discontinuity at the transaction from turbulent to laminar flow. The step or jump height is dependent upon the geometry, which is to say from the ratio $\delta/d$ of the tubular wall material.

It is further possible to read off from the graphs the flow region in which the filter coefficient reaches the smallest value and where the coverage number is correspondingly great, so that the activity of the filter accordingly reaches its highest value. As can be seen from the graphical representations, these minimum and maximum values lie in the region of strong laminar flow and in the transition region, about at the Reynolds numbers between 2500 and 5000. In the construction of a filter, it is possible to provide both regions at the same time in which, for example, bundles of tubes are arranged in the filter so that the gas flows along their lengths both internally and externally.

From the above illustration it follows that although the absolute values given in the graphical representations strictly have validity only for the particular case involved, yet the filter characteristic thus given makes possible, however, a qualitative statement also for other operating conditions and other geometrical arrangements of the filter material. The desired absolute magnitude of the activity of the filter can be directly obtained by the arrangement of a corresponding multiplicity of tubes arranged in parallel.

EXAMPLE II

In order to test the effectiveness of a simple filter consisting of a straight piece of tubing, contaminated helium was caused to flow through a piece of tubing of 95.5% pure titanium in two completely separate tests at different temperatures. The helium gas contained the fission products Cs-137, Cs-134 and Ag-110m. A catch-all filter was connected downstream of the tube under test for measuring all of the quantity of fission products coming out of the tubular filter. The content of fission products in the helium thereby measured was different for the two tests. The tubes had a length of 2370 mm, an outer diameter of 24.5 mm and a wall thickness of 1.65 mm. The temperature of the helium entering the filter in the first case was 825° C. and in the second case 750° C. In both cases the exit temperature was 210° C. The temperature of the tube walls was stable and therefore readily measurable during operation.

During operation of the filter, the flow of the helium was so adjusted that the mass throughput of 15 Nm³/hr. was obtained. The duration of the filtering operation was 785 hours in the first test and 1029 hours in the second test.

For calculation of the filter coefficient of the filter and thus of the effectiveness of the filter, the following values were substituted in Equation I:

For Cs-137: $1-0.2°/_{oo}$; $Q=38$(Kcal/Mol)

Cs-134: $1-\beta=0.1°/_{oo}$; $Q=38$(Kcal/Mol)

Ag-110m: $1-\beta=0.04°/_{oo}$; $Q=50$(Kcal/Mol)

and $\omega_o=1.308 \cdot 10^{11} \sec^{-1}$.

On account of the temperature gradient in the tube the filter was subdivided into several sections for the purpose of calculation by Equation I. With the calculated filter escape coefficient $\delta$, there were calculated the aggregate radioactivity values in $\mu$Ci for the fission products getting through the filter and these were compared with the values measured in the catch-all filter. There are given below the calculated and experimental values in opposite columns:

TABLE I

|  | Calculated | Measured |
|---|---|---|
| First Test: |  |  |
| Cs-137 | 1.00 | 1.20 |
| Cs-134 | 0.79 | 0.84 |
| Ag-110 m | 11.4 | 11.7 |
| Second Test: |  |  |
| Cs-137 | 0.52 | 0.59 |
| Cs-134 | 1.6 | 1.7 |
| Ag-110 m | 5.1 | 5.6 |

EXAMPLE III

In a manner corresponding to the tests of the Example II a filter consisting of a tube of stainless steel ×10 CrNiTi 189 (former designation 4541) of the same diameter and wall thickness given in the case of Example I, but having a length of 140 cm was tested. The temperature of the gas upon entry into the filter was in both cases 625° C. and upon exit from the filter, 210° C. The duration of the operation was 810 hours in the first case and 790 in the second.

For calculating the filter escape coefficient $\delta$, the following values were inserted into Equation I.

For Cs-137 $1-\beta=0.7°/_{oo}$; $Q=45$ Kcal/Mol

Cs-134 $1-\beta=0.33°/_{oo}$; $Q=45$ Kcal/Mol

Ag-110m $1-\beta=0.2°/_{oo}$; $Q=28$ Kcal/Mol and $\omega_o=1.308 \cdot 10^{11} T \sec^{-1}$.

TABLE II

|  | Calculated | Measured |
|---|---|---|
| First Test: |  |  |
| Cs-137 | 2.1 | 2.2 |
| Cs-134 | 1.07 | 0.96 |

TABLE II-continued

|  | Calculated | Measured |
|---|---|---|
| Ag-110 m | 6.2 | 6.5 |
| Second Test: |  |  |
| Cs-137 | 1.92 | 2.1 |
| Cs-134 | 1.03 | 1.1 |
| Ag-110 m | 3.26 | 3.51 |

EXAMPLE IV

The constructional data for a filter consisting of parallel arrangement of tubes illustrated in FIG. 4 were calculated for predetermined operating conditions.

As is evident from FIG. 3, the filter consists of a multiplicity of parallel tubes arranged with uniform spacing from each other, the entire group arranged in the interior space enclosed by an outer tubular lateral enclosure 2. The outer diameter of the individual tubes of the tube bundle is $d_a$, the inner diameter of each of the tubes is $d_i$, the length is l, and the inner diameter of the lateral enclosure is $D_i$. The gas to be purified flow not only through the tubes of the filter, but also in the spaces around them within the lateral enclosure.

The gas to be purified is helium that contains fission products Cs-137 and Ag-110m.

The contemplated operating conditions are: Mass throughput of helium: $\dot{m}=11.25$ kg/sec., Helium temperature at filter input: T=950° C., Helium pressure: p=40 bar, Contemplated operation duration: t=30 years.

Material for the tubes: heat resistant steels were provided which have a body-centered cubic structure or which, as for example, Incoloy-802 and Inconel-625, have a face-centered cubic structure. For the materials just mentioned, the penetration coefficient for Cs-137 is $1-\beta=0.7°/_{oo}$ and for Ag-110m is $1-\beta=0.2°/_{oo}$. For the binary diffusion constant which is used to calculate the mass transfer coefficient h, the following values, for T=950° C. and p=40 bar, were used:

$D_{Cs-He}=0.146$ cm²/sec.

$D_{Ag-He}=0.272$ cm²/sec.

The values of h and St' needed for calculation of the coverage number De were obtained from the German Industry Association (VDI) heat atlas and from volume 14, Int. J, Heat Mass Transfer, pp. 1235-1259 (Pergamon Press). Since in the present case, the conditions:

$2\sqrt{\zeta t}>>1$ and $(\lambda+\theta^*)t>2\sqrt{\zeta t}$ and $\theta^*>>\lambda$ are fulfilled, the calculation of the construction data for the filter was carried out according to Equation III.

Under the assumption that the volume of the filter does not exceed 40 m³, that the pressure loss is not greater than 0.1 bar and the filter coefficient $\delta$ for silver is between $6 \cdot 10^{-4}$ and $8.8 \cdot 10^{-3}$ and for caesium is between $1.2 \cdot 10^{-5}$ and $2 \cdot 10^{-3}$, the construction data in the table given below were calculated for the filter. The values there for $d_i$ and $d_a$, as well as those for $D_i$ and l are given in cm. N is the number of parallel tubes in the filter. Along with the constructional data, there are given the values for the pressure drop $\Delta p$ in the filter, in bar, as well as the values for the respective filter coefficients. The value for $\Delta p$ was calculated according to the VDI heat atlas and volume 14 Int. J Heat Mass Transfer, pp. 1235-1259 (Pergamon Press).

TABLE III

| N | $d_i$ | $d_a$ | $D_i$ | l | $\delta$ Cs-137 | $\delta$ Ag-110 m | $\Delta p$(bar) |
|---|---|---|---|---|---|---|---|
| 95000 | 0,55 | 0,75 | 300 | 500 | $1,53 \cdot 10^{-3}$ | $8,76 \cdot 10^{-3}$ | 0,063 |
| 95000 | 0,55 | 0,75 | 300 | 600 | $4,64 \cdot 10^{-4}$ | $4,18 \cdot 10^{-3}$ | 0,076 |
| 145000 | 0,35 | 0,55 | 300 | 600 | $3,162 \cdot 10^{-4}$ | $5,26 \cdot 10^{-3}$ | 0,085 |
| 190000 | 0,35 | 0,55 | 325 | 600 | $1,26 \cdot 10^{-5}$ | $6,29 \cdot 10^{-4}$ | 0,089 |
| 190000 | 0,35 | 0,55 | 325 | 500 | $4,886 \cdot 10^{-4}$ | $2,129 \cdot 10^{-3}$ | 0,074 |
| 190000 | 0,35 | 0,55 | 325 | 400 | $1,97 \cdot 10^{-3}$ | $7,228 \cdot 10^{-3}$ | 0,059 |

EXAMPLE V

As in Example IV, the constructional data for a filter consisting of parallel tubes were calculated for the same operating conditions, except for input gas temperature which was 300° C. in this case. As material for the tubes, a feritic steel of type 15 mo03 was selected. For this material, the penetration coefficient and the desorption energy Q have the following values:

For Cs-137:

$1-\beta = 1{,}2\,^{\circ}/_{oo}$; $D_{Cs-He} = 0{,}039$ cm²/sec.

$Q = 65$ kcal/Mol, and $\omega_o = 1{,}308 \cdot 10^{11} T$ sec$^{-1}$.

For Ag-110m $1-\beta = 0{,}3\,^{\circ}/_{oo}$; $D_{Ag-He} = 0{,}072$ cm²/sec.

$Q = 52$ kcal/Mol and $\omega_o = 1{,}308 \cdot 10^{11} T$ sec$^{-1}$.

Since in the present case, the conditions:

$2\sqrt{\zeta t} \ll 1$ and $(\lambda + \theta^*)\, t \ll 1$ and fulfilled, the calculation of the constructional data for the filter was carried out according to Equation II.

Under the assumption that the volume of the filter does not exceed 17.2 m³, that the pressure loss $\Delta p$ is much greater than 0.11 bar and that the filter coefficient $\delta$ for a caesium amounts to $1.06 \cdot 10^{-4}$ and for silver amounts to $5.61 \cdot 10^{-6}$, the following constructional data are obtained:

| | |
|---|---|
| $N = 10^5$ | $D_i = 230$ cm |
| $d_i = 0.3$ cm | $l = 350$ cm |
| $d_a = 0.55$ cm | |

The pressure drop amounts to $\Delta p = 0.105$ bar.

EXAMPLE VI

For the operating conditions given in Example V, the constructional data were calculated for a filter consisting of a multiplicity of parallel and equally spaced rods, that, just like the tubes in Example V, were located within a surrounding casing. In this case, the following values were obtained for the materials specified in Example V:

For the filter escape coefficient, $\delta = 1.62 \cdot 10^{-3}$ for Cs-137 and $\delta = 4.4 \cdot 10^{-5}$ for Ag-110m and, with the assumption that the volume of the filter is not greater than 10.5m³ and that the pressure loss $\Delta p$ is not greater than 0.125 bar:

| | |
|---|---|
| $N = 1.2 \cdot 10^5$ | $l = 250$ cm |
| $d_a = 0.5$ cm | |
| $D_i = 230$ cm | |

The pressure drop amounts to $\Delta p = 0.124$ bar.

For the filter escape coefficient $\delta = 5.814 \cdot 10^{-3}$ for Cs-137 and $\delta = 3.272 \cdot 10^{-4}$ for Ag-110m and for the otherwise identical values for N, $d_a$, $d_i$, the length l was 200 cm and $\Delta p$ was 0.11 bar.

I claim:

1. A method for design and manufacture of a filter for cleaning atomic or molecular contaminating particles out of a flowing gas and retaining said particles by adsorption followed by absorption in the filter material without constraining the gas to flow through tortuous pores in bodies or layers of filter material, which filter is provided with a gas-tight casing surrounding a cavity through which gas is caused to flow and with at least one solid filter material having a selective holding back effect on the particles but not on said gas by a mutual interaction and disposed so as to occupy a length l in the flow direction of the gas and to provide in said cavity a hydraulic diameter $d_{eff}$, said method comprising the steps of:

selecting a filter escape coefficient $\delta(l,t)$, corresponding to a desired filter capability to be attained:

selecting a value of said length l and of said hydraulic diameter $d_{eff}$ such that, for a particular gas-flow velocity and a particular mass transfer coefficient, the product of their quotient ($l/d_{eff}$) and the second Stanton number St' is large enough for attaining said filter coefficient, said second Stanton number being the ratio (h/v) of said mass transfer coefficient to said gas-flow velocity, both being expressed in cm/sec, and selecting a filter material from among those having a known sticking probability for particles of a particular contaminating material to be filtered out and making from said material at least one substantially rigid element to be disposed in a predetermined arrangement in said cavity, said material being selected on the basis of a predetermined service life t of the filter during which said contaminating particles held back by said filter materials accumulate, and according to the following criteria:

(a) the material has a sufficiently high surface adsorptive sticking probability $\alpha$ for particles of said contaminant on the surface of said element of said material, (b) the material is one for which the desorption constant ($\theta$) regarding said contaminant is sufficiently small, (c) the material is one for which the penetration coefficient $(1-\beta)$, and hence also the probability that said contaminant particles do not remain on the surface of the material but rather enter into the material and become irreversibly bound therein, is sufficiently large, in each case sufficiently so for attaining said filter capability, and (d) that the saturation content ($\phi\infty$) and the diffusion constant (D) are sufficiently large for the product $$\frac{(1-\beta)\alpha^* N_G}{\sqrt{D}} \sqrt{t}$$

to be smaller than unity, the quantities contributing to said product being defined as follows:
$\alpha^* = \alpha \cdot 3.63 \cdot 10^3 \, (\tau/A)$ in cm/sec
A = mass number of the particles
T = temperature of the surface of the filter material in K.°
$N_G$ = concentration of the particles in the gas in atoms per cm$^3$
$\phi\infty$ = maximum number of particles that the particular material can take up in atoms per cm$^3$.

2. A method as defined in claim 1 in which, for a filter for service at an operating temperature below 400° C. and which, during a prescribed service life t for the filter material, does not reach the adsorption-desorption equilibrium for the capture of particles on the surface of the filter material, said values of said length l and of said hydraulic diameter $d_{eff}$ are so selected and said filter material is selected for having so high a sticking probability $\alpha$ for said contaminating particles that said filter escape coefficient $\delta$, when expressed as the base e of natural logarithms raised to a power, has a value of substantially $\delta = e^{-E_1}$ where $$E_1 = \frac{4l}{d_{eff}} \cdot St'.$$

3. A method as defined in claim 1 in which, for a filter for service at an operating temperature above 600° C. and which during a prescribed service life t for the filter material reaches the adsorption-desorption equilibrium for the capture of particles of the kind to be filtered on the surface of the filter material, said filter material is selected as having so great a penetration coefficient $(1-\beta)$ and said values of said length l and of said hydraulic diameter $d_{eff}$ are so chosen that said filter escape coefficient $\delta$, when expressed as the base e of natural logarithms raised to a power, has a value of substantially $$\delta = e^{-E_2} \text{ where } E_2 = \frac{4l}{d_{eff}} \cdot St' \cdot \frac{(1-\beta)\alpha^*}{h + (1-\beta)\alpha^*}.$$

4. A method as defined in claim 1 in which, in order to obtain a service life t that is as long as possible with a small filter escape coefficient $\delta$ that remains constant, the thickness $\epsilon$ of the filter material for filtering radioactive particles is much greater than the square root of the quotient (D/$\lambda$) obtained by dividing the diffusion coefficient D for the particles in the filter material by the decay constant $\lambda$ in sec$^{-1}$ for the substance of said particles and for filtering non-radioactive substances said thickness $\epsilon$ is selected to be much greater than the square root of the product of said diffusion coefficient D and said service life t.

5. A filter for cleaning atomic or molecular particles of a contaminating substance out of a flowing gas by adsorption followed by absorption, without constraining the gas to flow through tortuous pores in bodies or layer of filter material, which filter is provided with a gastight casing surrounding a cavity, means for causing the gas to be cleaned to flow therethrough, and a filter material therein having a selective holding-back effect on the particles but not on said gas by mutual interaction, said filter material occupying some but not all of the space in said cavity so that the gas may flow, through passages together having a hydraulic diameter $d_{eff}$ for contact with the filter material over a length l in the flow direction if the gas, in which filter, the improvement is provided consisting in that, in order to obtain a predetermined holding-back capability of the filter and thereby attaining a predetermined value of the filter escape coefficient $\delta$ (l,t):

(a) said length l and said hydraulic diameter $d_{eff}$ have values such that the product of the second Stanton number and the quotient obtained by dividing said length by said effective free diameter $$\left(\frac{l}{d_{eff}} \cdot St'\right)$$

is sufficiently large to enable said value of filter escape coefficient to be attained;
(b) the filter material is a material having for the particular gas containing said contaminating substance, for a predetermined rate of flow of said gas and for the predetermined service life t of the filter,
(i) the adsorptive sticking probability $\alpha$ for said particles of said contaminating substance at the surface of said material which is sufficiently large to enable said value of filter escape coefficient to be attained;
(ii) a desorption constant $\theta$ sufficiently small to enable said value of filter escape coefficient to be attained;
(iii) a penetration coefficient $(1-\beta)$, and thereby a probability that said particles do not remain on the surface of said material but enter into the interior thereof is sufficiently small to enable said value of filter escape coefficient to be attained;
(iv) a saturation content value $\phi\infty$ and a diffusion constant D of said contaminating substance so great that the value $\phi\infty$ and the product of (i) the quotient obtained by dividing said penetration coefficient $(1-\beta)$ by the square root of said diffusion constant D, (ii) the quotient obtained by dividing the concentration $N_G$ of said particles in said gas, in cm$^3$ by said saturation content value (iii) the square root of said service life t and (iv) a value $\alpha^*$, in cm/sec., equal to 3.63·10$^3$ times the product of said sticking probability $\alpha$ and the temperature (T) of the surface of the filter material in °K., divided by the mass number (A) of the particles, is less than unity, and
(c) said filter material is provided in said cavity in the form of at least one substantially rigid piece of solid material mounted in said cavity.

6. A filter as defined in claim 5 in which there is a plurality of said rigid pieces of filter material disposed in the filter cavity which provide channels in organized geometrical arrangement for passage of the said gas flowing therethrough.

7. A filter as defined in claim 5 in which the filter material consists of a plurality of tubular pieces so disposed in the filter cavity as to cause the flowing gas to flow lengthwise through the pieces and to flow around the pieces either lengthwise or transversely.

8. A filter as defined in claim 5 in which the filter material is in the form of rod-shaped pieces and so disposed in the filter cavity as to cause the flowing gas to flow around them either lengthwise or transversely.

9. A filter as defined in claim 6 of a kind suitable for service at temperatures of said filter material lying below 400° C. and in which, during a prescribed service life t, the filter material does not reach the adsorption-desorption equilibrium for the sticking of said particles on the surface of the filter material and in which therefore said values of said length l and of said hydraulic diameter $d_{eff}$ are such and said filter material has so high an adsorptive sticking probability $\alpha$ for said contaminant particles that said filter escape coefficient $\delta$ (l,t), when expressed as the base e of natural logarithms raised to a power, has a value of substantially $\delta = e^{-E_1}$ where $$E_1 = \frac{4l}{d_{eff}} \cdot St'.$$

10. A filter as defined in claim 5 of a kind suitable for service at temperatures of said filter material lying above 600° C. and in which, during a prescribed service life t, the filter material reaches adsorption desorption equilibrium for the sticking said particles on the surface of the filter material, and which, therefore, said filter material has so great a penetration coefficient $(1-\beta)$ and said values of said length l and of said hydraulic diameter $d_{eff}$ are such that said filter escape coefficient $\delta$ (l,t), when expressed as the base e of natural logarithms raised to a power, has a value of substantially $\delta = e^{-E_2}$ where $$E_2 = \frac{4l}{d_{eff}} St' \cdot \frac{(1-\beta)\alpha^*}{h + (1-\beta)\alpha^*}.$$

11. A filter as defined in claim 5 of a design for maximizing the service life t, while keeping said filter coefficient small, in which the thickness $\epsilon$ of the filter material is such that, for radioactive substances to be filtered out, said thickness is much smaller than the square root of the quotient obtained by dividing said diffusion constant D by the decay constant $\lambda$ in $\sec^{-1}$ for said substance and for the case of non-radioactive substances to be filtered out, said thickness $\epsilon$ is much smaller than the square root of the product of said diffusion constant D and said service life t.

12. A filter as defined in claim 5 in which the filter material is in the form of a plurality of substantially rigid pieces mounted in said cavity, made of material having the highest possible capability for holding back particles of said contaminant and is arranged in a geometrical pattern within said cavity providing passages for the flow of the gas extending over said length l and in which filter said length l and said hydraulic diameter $d_{eff}$ have values such that for a given pressure loss $\Delta p$ and for a given filter volume the product of said second Stanton number St' and the quotient obtained by dividing said length l by said diameter $d_{eff}$, is a maximum, said second Stanton number St' being equal to the ratio of the mass transfer coefficient h to the flow velocity v of the gas.

* * * * *

UNITED STATES PATENT AND TRADEMARK OFFICE
CERTIFICATE OF CORRECTION

PATENT NO. : 4,428,756

DATED : January 31, 1984

INVENTOR(S) : Nicolaos INIOTAKIS

It is certified that error appears in the above-identified patent and that said Letters Patent is hereby corrected as shown below:

Replace " $\theta\cdot$ " by -- $g^*$ -- at each of the following places:

Column 3, line 63; Column 4, line 15; Column 5, lines 47 and 51; Column 6, line 20 (both occurrences); Column 10, line 51 (both occurrences); and Column 11, line 46.

Replace " $\theta$ " by -- $g$ -- in Column 4, line 15, and also line 19.

Delete the formulae printed between lines 46 and 56 and replace with: -- $\eta \cdot \sqrt{i} < 1$ --.

In Column 4, line 47, before "particular" insert --a-- and in line 48, before "filter" delete "a".

UNITED STATES PATENT AND TRADEMARK OFFICE
CERTIFICATE OF CORRECTION

PATENT NO. : 4,428,756
DATED : January 31, 1984
INVENTOR(S) : Nicolaos Iniotakis It is certified that error appears in the above-indentified patent and that said Letters Patent is hereby corrected as shown below:

In Column 7, line 55, replace "m" with --$\dot{m}$--.

In Column 13, line 5, change the denominator of the fraction from " $\sqrt{D}$ " to --$\sqrt{D \phi_\ast}$--; and in line 10, replace " $(r/A)$ " with --$\sqrt{\frac{r}{A}}$--.

Signed and Sealed this

Twenty-fourth Day of August, 1993

Attest:

BRUCE LEHMAN

*Attesting Officer*    *Commissioner of Patents and Trademarks*